United States Patent [19]

Schoening

[11] Patent Number: 4,756,873

[45] Date of Patent: Jul. 12, 1988

[54] SINGLE LOOP NUCLEAR POWER PLANT FOR CURRENT GENERATION WITH A HELIUM COOLED HIGH TEMPERATURE REACTOR

[75] Inventor: Josef Schoening, Hambruecken, Fed. Rep. of Germany

[73] Assignee: Hochtemperatur-Reaktorbau GmbH, Fed. Rep. of Germany

[21] Appl. No.: 61,309

[22] Filed: Jun. 12, 1987

[30] Foreign Application Priority Data

Jun. 13, 1986 [DE] Fed. Rep. of Germany ....... 3619544

[51] Int. Cl.⁴ ............................................. G21C 13/10
[52] U.S. Cl. ..................................... 376/294; 376/299; 376/381; 376/391; 376/406
[58] Field of Search ................ 376/293, 294, 299, 381, 376/391, 406

[56] References Cited

U.S. PATENT DOCUMENTS

| | | | |
|---|---|---|---|
| 3,070,530 | 12/1962 | Metcalf | 376/381 |
| 3,998,057 | 12/1976 | Haferkamp et al. | |
| 4,050,984 | 9/1977 | Arndt et al. | |
| 4,088,535 | 5/1978 | Thompson et al. | 376/293 |

FOREIGN PATENT DOCUMENTS

| | | |
|---|---|---|
| 2241426 | 8/1972 | Fed. Rep. of Germany. |
| 2404843 | 2/1974 | Fed. Rep. of Germany. |
| 8495 | 1/1976 | Japan ................................ 376/293 |
| 975058 | 11/1964 | United Kingdom ................ 376/293 |

*Primary Examiner*—Deborah L. Kyle
*Assistant Examiner*—Richard Wendtland
*Attorney, Agent, or Firm*—Robert J. Koch

[57] ABSTRACT

A single loop nuclear power plant with a helium cooled high temperature reactor for generation of electric current, designed for a capacity of 1-5 MWe. The plant, which in addition to the high temperature reactor includes a gas turbine assembly and a heat exchange apparatus, is housed in two pressure vessels located above each other and connected in a releasable manner. The lower pressure vessel contains the high temperature reactor and is charged with the primary gas. The other circulation components are located in the upper pressure vessel which is filled with a protective gas. The gas turbine, the radiators, the high temperature compressor, the intermediate radiators, and the low pressure compressor, are arranged above each other in this sequence and aligned with the high temperature reactor. the recuperator is laterally arranged. A generator may also be located in the upper pressure vessel or in a container set upon the upper pressure vessel.

10 Claims, 1 Drawing Sheet

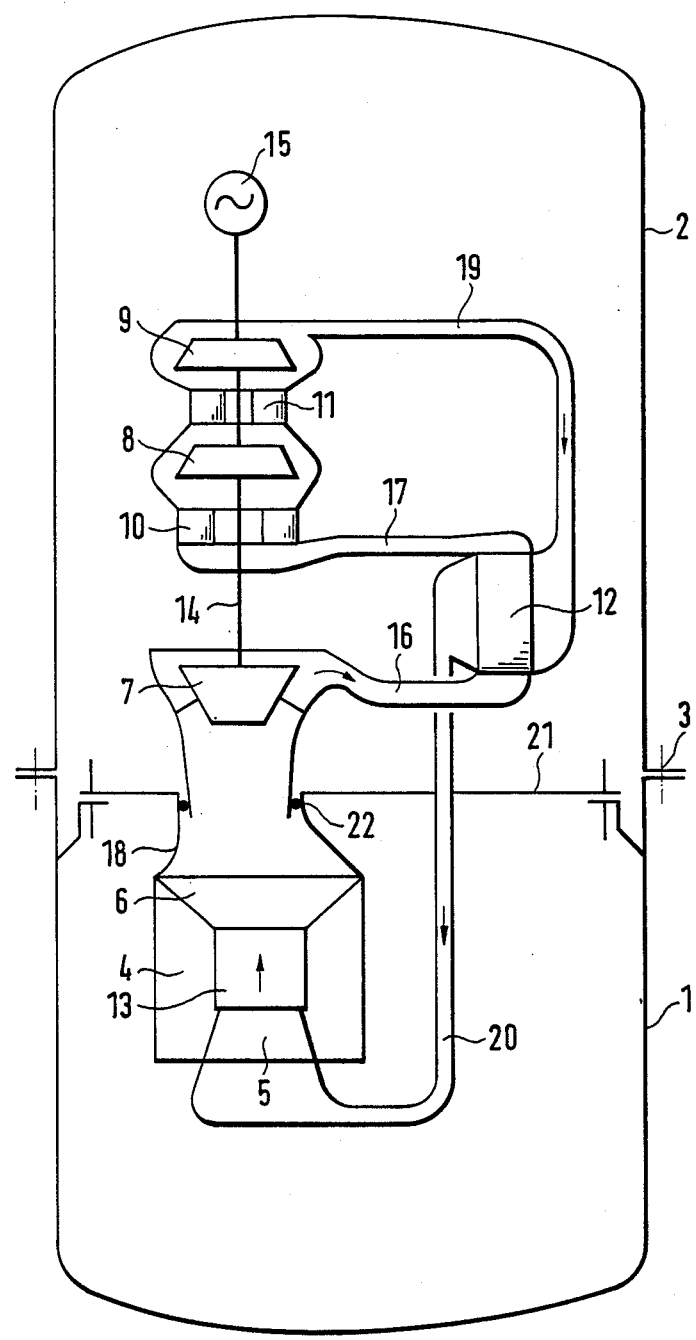

SINGLE LOOP NUCLEAR POWER PLANT FOR CURRENT GENERATION WITH A HELIUM COOLED HIGH TEMPERATURE REACTOR

BACKGROUND OF THE INVENTION

1. Field of the Invention

The invention relates to a single loop nuclear power plant for electrical power generation, and more paprticularly to a plant with helium cooled high temperature reactor utilizing spherical fuel elements. The plant has a gas turbine aggregate made up of a gas turbine and a two-stage compressor, with a heat exchanger apparatus exhibiting radiators, intermediate radiators and a recuperator, together with gas carrying lines between components of the loop.

2. Description of the Related Technology

The installation described in DE Nos. 22 41 426 and 24 04 843 have a gas turbine aggregate located in a horizontal tunnel below the high temperature reactor installed in the center cavity of a prestressed pressure vessel. The heat exchange apparatuses are located in vertical shafts, arranged on a partial circle around the center cavity. The known single loop nuclear power plants are desired for higher capacities and require much space in spite of their compact layout.

SUMMARY OF THE INVENTION

An object of the invention is to develop a plant suitable for an output of 1 to 5 MWe and requiring a small amount of space.

The object may be attained by a single loop nuclear power plant for electric current generation with a helium cooled high temperature reactor charged with spherical fuel elements. A gas turbine aggregate or assembly of a gas turbine and a two-stage compressor with heat exchange apparatus is utilized. The heat exchange apparatus comprise radiators, intermediate radiators and a recuperator, together with gas carrying lines between the circulation components. The plant is housed in two releasably connected pressure vessels placed above each other. The pressure vessels are separated in a gas tight manner. The lower pressure vessel contains the high temperature reactor and is charged with the primary gas. The upper pressure vessel is filled with a protective gas and contains the circulation components. The gas turbine, radiators, low pressure compressor, intermediate radiators, high pressure compressor, and the generator are arranged above each other in sequence and aligned with the high temperature reactor. The recuperator may be located laterally from the other circulation components and connected to the gas turbine and the radiators by approximately horizontal gas lines.

The installation is arranged for upward helium flow through the high temperature reactor. Thereafter the helium is conducted through a gas conduit directly to the inlet of the gas turbine.

The two pressure vessels are preferably cylindrical and made of steel. The spherical fuel elements forming the reactor core remain in the high temperature reactor until their final burnup. If power production requirements are for a limited time period, use of a plant according to the invention is favorable.

The installation may be laid out against external effects, such as for example earthquakes due to its compact configuration.

The generator may be installed in the upper pressure vessel or in its own container set upon the upper pressure vessel. The gas turbine aggregate may be bearingly supported in either dry or magnetic bearings.

Single loop nuclear power plant according to claims 2 or 3, characterized in that the generator may advantageously be a high speed generator without topping gear and equipped with magnetic bearings. The protective gas for the upper pressure vessel may be helium or nitrogen. Any decay heat may be removed by natural convection through the radiators.

Advantageous further developments of the invention will become apparent from the description below of an embodiment with reference to the schematic drawing.

BRIEF DESCRIPTION OF THE DRAWING

The FIGURE shows an embodiment of a plant according to the invention.

DETAILED DESCRIPTION OF THE PREFERRED EMBODIMENT

The FIGURE shows a lower pressure vessel 1 and an upper pressure vessel 2, both made of steel and releasably connected to each other. They may be connected by a flange connection 3.

A helium cooled high temperature reactor 4 is installed in the lower pressure vessel 1, the core 13 has spherical fuel elements with an upward helium flow. The pressure vessel 1 also contains helium which is under the same pressure as the cooling gas. A cold gas collector space 5 is located under the high temperature reactor 4, while over the reactor a hot gas collector space 6 is provided.

All of the other circulation components are housed in the upper pressure vessel 2. The two pressure vessels 1 and 2 are separated from each other in a gas tight manner by an intermediate flange 21. The flange 21 is designed for full pressure. The circulator components comprise a gas turbine 7, a two-stage compressor exhibiting a low pressure compressor 8 and a high pressure compressor 9. The heat exchange apparatuses including one or more radiators 10, one or more intermediate radiators 11 and a recuperator 12 are arranged in the upper pressure vessel. The gas turbine 7, the low pressure compressor 8 and the high pressure compressor 9 are seated on a shaft 14 coupled to a generator 15. All of these components are supported in dry or magnetic bearings.

The generator 15 is located within the pressure vessel 2 in the illustrated embodiment. The generator 15 may alternatively be placed in a separate container set on the pressure vessel 2. Preferably, a high speed generator without preceding topping gear is used. The pressure vessel 2 may be filled with a protective gas, such as helium or nitrogen.

As shown by the figure, the gas turbine 7, the radiators 10, the low pressure compressor 8, the intermediate radiators 11 and the high pressure compressor 9 are arranged above each other, in an alignment with the high temperature reactor 4. The recuperator 12 occupies a lateral position, located in the gas between the gas turbine 7 and the radiators 10. It is connected to the outlet of the gas turbine 7 by an approximately horizontal gas line 16. It is connected to the radiators 10, preceding the low pressure compressor 8, by a similar gas line 17.

The inlet of the gas turbine 7 is connected to the hot gas collector space 6 by a gas conduit 18. A gas tight connector location is provided in the gas conduit 18 in the form of a slide connection 22. A vertical gas line 20 is connected to the cold gas collector space 5, and to the outlet of the high pressure side of the recuperator 12. Alternatively, the cold gas carrying gas line 20 under the pressure vessel 1 may be eliminated. The cold gas is then conducted directly into the pressure vessel 1 wherein it flows to the cold gas collector space 5 (not shown). In this embodiment at the entry location of the gas line 20 into the pressure vessel 1 by a slide connection is provided.

The circulation of the primary gas through the plant is described as follows.

The heated helium coming from the reactor core 13 is transported through the hot gas collector space 6 and the gas conduit 18 to the gas turbine 7, expanding therein. Subsequently, it flows through the gas line 16 and on the jacket side, through the recuperator 12, while heating the high pressure cold helium flowing in the bundle tubes. The gas then passes through the gas line 17 to the radiators 10. In the radiators 10 the helium is further cooled and then enters the low pressure compressor 8. Following compression and repeated cooling in the intermediate radiators 11 preceding the high pressure compressor 9, the helium is further compressed in the compressor 9 and is finally returned through the gas line 19 to the recuperator 12. Here it is distributed over the bundle tubes and heated by the low pressure gas. Subsequently, the helium is conducted through the gas line 20 to the cold gas collector space 5 and the circulation begins anew.

Decay heat may be removed from an inactive plant by natural convection through the radiators 10. The shutdown and regulation of the installation ae effected by means of absorber rods, which may be displacably arranged in a reflector laterally surrounding the core 13 (not shown).

I claim:

1. A single loop nuclear power plant for generation of electricity comprising:
    a lower pressure vessel;
    an upper pressure vessel releasably connected to and sealed in a gas tight fashion from said lower pressure vessel;
    a high temperature gas cooled reactor with an upward coolant flow path and spherical fuel elements, located in said lower pressure vessel;
    a turbine aligned in said upward coolant flow path above said reactor in said upper pressure vessel;
    a recuperator connected to said reactor and said turbine in said upper pressure vessel;
    a radiator connected to said recuperator in said upper pressure vessel aligned above said turbine;
    a low pressure compressor connected to and aligned above said radiator in said upper pressure vessel;
    an intermediate radiator connected to and aligned above said low pressure compressor in said upper pressure vessel;
    a high pressure compressor connected to said recuperator and said intermediate radiator aligned above said intermediate radiator in said upper pressure vessel;
    a generator aligned above said high pressure compressor;
    wherein said lower pressure vessel is charged with primary gas and said upper pressure vessel is filled with a protective gas.

2. A plant according to claim 1, wherein said generator is located within said upper pressure vessel.

3. A plant according to claim 1, further comprising:
    a container located above said upper pressure vessel, housing said generator.

4. A plant according to claim 1, further comprising dry bearings supporting said turbine, high pressure compressor and low pressure compressor.

5. A plant according to claim 1, further comprising magnetic bearing supporting said turbine, high pressure compressor, and low pressure compressor.

6. A plant according to claim 1, wherein said generator is a high speed no topping gear generator exhibiting magnetic bearings.

7. A plant according to claim 1, wherein said protective gas is helium.

8. A plant according to claim 1, wherein said protective gas is nitrogen.

9. A plant according to claim 1, wherein said radiators exhibit sufficient capacity for natural convection decay heat removal.

10. A plant according to claim 1, further comprising a shaft linking said turbine, low pressure compressor, high pressure compressor and generator.

* * * * *